(12) United States Patent
Nelson et al.

(10) Patent No.: US 8,549,741 B2
(45) Date of Patent: Oct. 8, 2013

(54) SUSPENSION METHOD FOR COMPLIANT THERMAL CONTACT OF ELECTRONICS MODULES

(75) Inventors: Michael J. Nelson, Prior Lake, MN (US); Michael J. Wayman, Waconia, MN (US); Kevin Thompson, Chaska, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 1162 days.

(21) Appl. No.: 12/470,648

(22) Filed: May 22, 2009

(65) Prior Publication Data

US 2009/0311974 A1    Dec. 17, 2009

Related U.S. Application Data

(60) Provisional application No. 61/060,589, filed on Jun. 11, 2008.

(51) Int. Cl.
    *H05K 3/36*    (2006.01)
(52) U.S. Cl.
    USPC .............. 29/834; 29/592.1; 29/825; 29/829; 361/688; 361/689; 361/699; 361/714; 361/730; 455/73; 455/90.3; 455/90.2
(58) Field of Classification Search
    USPC ......... 29/830, 834, 592.1, 825, 829; 361/714, 361/689, 688, 699, 730, 715; 455/90.3, 455/90.2, 73
    See application file for complete search history.

(56) References Cited

U.S. PATENT DOCUMENTS

| | | | |
|---|---|---|---|
| 5,461,542 A | 10/1995 | Kosak | |
| 5,710,804 A | 1/1998 | Bhame et al. | |
| 5,930,116 A | 7/1999 | Palmer | |
| 6,038,129 A * | 3/2000 | Falaki et al. | 361/699 |
| 6,082,441 A | 7/2000 | Boehmer et al. | |
| 6,142,595 A | 11/2000 | Dellapi et al. | |
| 6,579,029 B1 | 6/2003 | Sevde et al. | |
| 7,116,555 B2 | 10/2006 | Kamath | |
| 7,130,193 B2 | 10/2006 | Hirafuji | |
| 7,177,154 B2 | 2/2007 | Lee | |
| 7,277,286 B2 | 10/2007 | Lee | |
| 7,379,751 B2 * | 5/2008 | Wada et al. | 455/552.1 |
| 7,457,123 B1 | 11/2008 | Wayman | |
| 7,652,880 B2 | 1/2010 | Wayman | |
| 7,719,856 B2 | 5/2010 | Nelson | |
| 7,724,521 B2 | 5/2010 | Nelson | |
| 7,864,534 B2 | 1/2011 | Wayman | |
| 2005/0168941 A1 | 8/2005 | Sokol | |
| 2006/0196640 A1 | 9/2006 | Siu | |

(Continued)

FOREIGN PATENT DOCUMENTS

DE    19515122    10/1996

*Primary Examiner* — Peter DungBa Vo
*Assistant Examiner* — Azm Parvez
(74) *Attorney, Agent, or Firm* — Fogg & Powers LLC

(57) ABSTRACT

A communication module is provided. In one embodiment, the communication module includes at least one transceiver, a filter communicatively coupled with the at least one transceiver, a power amplifier communicatively coupled to the at least one transceiver and the filter, a primary module chassis configured to hold the at least one transceiver, the filter, and the power amplifier, and a filter suspension frame assembly attached to the primary module chassis. The filter suspension frame assembly is configured to float the at least one transceiver in relation to the primary module chassis.

11 Claims, 7 Drawing Sheets

(56) References Cited

U.S. PATENT DOCUMENTS

| | | |
|---|---|---|
| 2007/0247809 A1 | 10/2007 | McClure |
| 2008/0043425 A1 | 2/2008 | Hebert |
| 2008/0237420 A1 | 10/2008 | Wayman et al. |
| 2008/0238270 A1 | 10/2008 | Wayman et al. |
| 2008/0239669 A1 | 10/2008 | Wayman |
| 2008/0239673 A1 | 10/2008 | Wayman |
| 2008/0239688 A1 | 10/2008 | Casey et al. |
| 2008/0278912 A1 | 11/2008 | Zavadsky et al. |
| 2009/0231815 A1 | 9/2009 | Kim |
| 2009/0310972 A1 | 12/2009 | Wayman |
| 2009/0311969 A1 | 12/2009 | Wayman |
| 2009/0311974 A1 | 12/2009 | Nelson |

\* cited by examiner

SUSPENSION METHOD FOR COMPLIANT THERMAL CONTACT OF ELECTRONICS MODULES

This application claims the benefit of U.S. Provisional Application No. 61/060,589, filed on Jun. 11, 2008, which is incorporated herein by reference in its entirety.

RELATED APPLICATIONS

This application is related to the following commonly assigned co-pending U.S. patent applications, filed on even date with U.S. Provisional Application 61/060,589, all of which are hereby incorporated herein by reference:

U.S. patent application Ser. No. 12/137,322, titled "COMMUNICATION MODULES" and which is referred to here as the '322 application;

U.S. patent application Ser. No. 12/137,297, titled "APPARATUS FOR MOUNTING A MODULE AND ENABLING HEAT CONDUCTION FROM THE MODULE TO THE MOUNTING SURFACE" and which is referred to here as the '297 application;

U.S. patent application Ser. No. 61/060,581, titled "CAM SHAPED HINGES" and which is referred to here as the '581 application; and U.S. patent application Ser. No. 61/060,593, titled "SYSTEMS AND METHODS FOR THERMAL MANAGEMENT" and which is referred to here as the '593 application.

BACKGROUND

In the field of telecommunications, there is a trend to reduce both the size and the expenses associated with infrastructure equipment. The result is a demand on telecommunications infrastructure equipment providers to manufacture smaller equipment that can be operated and maintained in a more cost effective manner, while retaining all the functionality of legacy equipment. The modularity of designs proposed for such equipment, along with the smaller sizes desired by system operators, has introduced new thermal management challenges for dissipating heat generated by telecommunications infrastructure equipment. For example, telecommunications equipment typically includes high-power components, such as power amplifiers and power supplies that generate a significant amount of heat. The same equipment will typically also include relatively lower power components, such as integrated circuits, digital circuits, and the like, that generate relatively less heat than the high-power components, but are also significantly more sensitive to heat. As the enclosures housing these components are reduced in size to address customer demands, one challenge faced is how to design a single enclosure that can house and provide adequate cooling for both high-power components and heat-sensitive low-power components while preventing the high-power components from overheating the low-power components.

For the reasons stated above and for other reasons stated below which will become apparent to those skilled in the art upon reading and understanding the specification, there is a need in the art for improved systems and methods for thermal management of telecommunications infrastructure equipment.

SUMMARY OF INVENTION

A communication module is provided. In one embodiment, the communication module includes at least one transceiver, a filter communicatively coupled with the at least one transceiver, a power amplifier communicatively coupled to the at least one transceiver and the filter, a primary module chassis configured to hold the at least one transceiver, the filter, and the power amplifier, and a filter suspension frame assembly attached to the primary module chassis. The filter suspension frame assembly is configured to float the at least one transceiver in relation to the primary module chassis.

The details of various embodiments of the claimed invention are set forth in the accompanying drawings and the description below. Other features and advantages will become apparent from the description, the drawings, and the claims.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Like reference characters denote like elements throughout Figures and text.

DETAILED DESCRIPTION

For the reasons stated above and for other reasons stated below which will become apparent to those skilled in the art upon reading and understanding the present specification, there is a need in the art for an effective and efficient method of forming a modular communication system. Embodiments of the present invention provide an effective and efficient method of forming communication modules including a power amplifier, a filter, and at least one transceiver. All of these components are tuned and calibrated so they work with each other to provide communications between communicatively coupled devices in a communication system. The communication modules (also referred to herein as modules) are all prewired and prepackaged and no extra hardware is needed to make the electronic components work with each other.

Figure 1A:
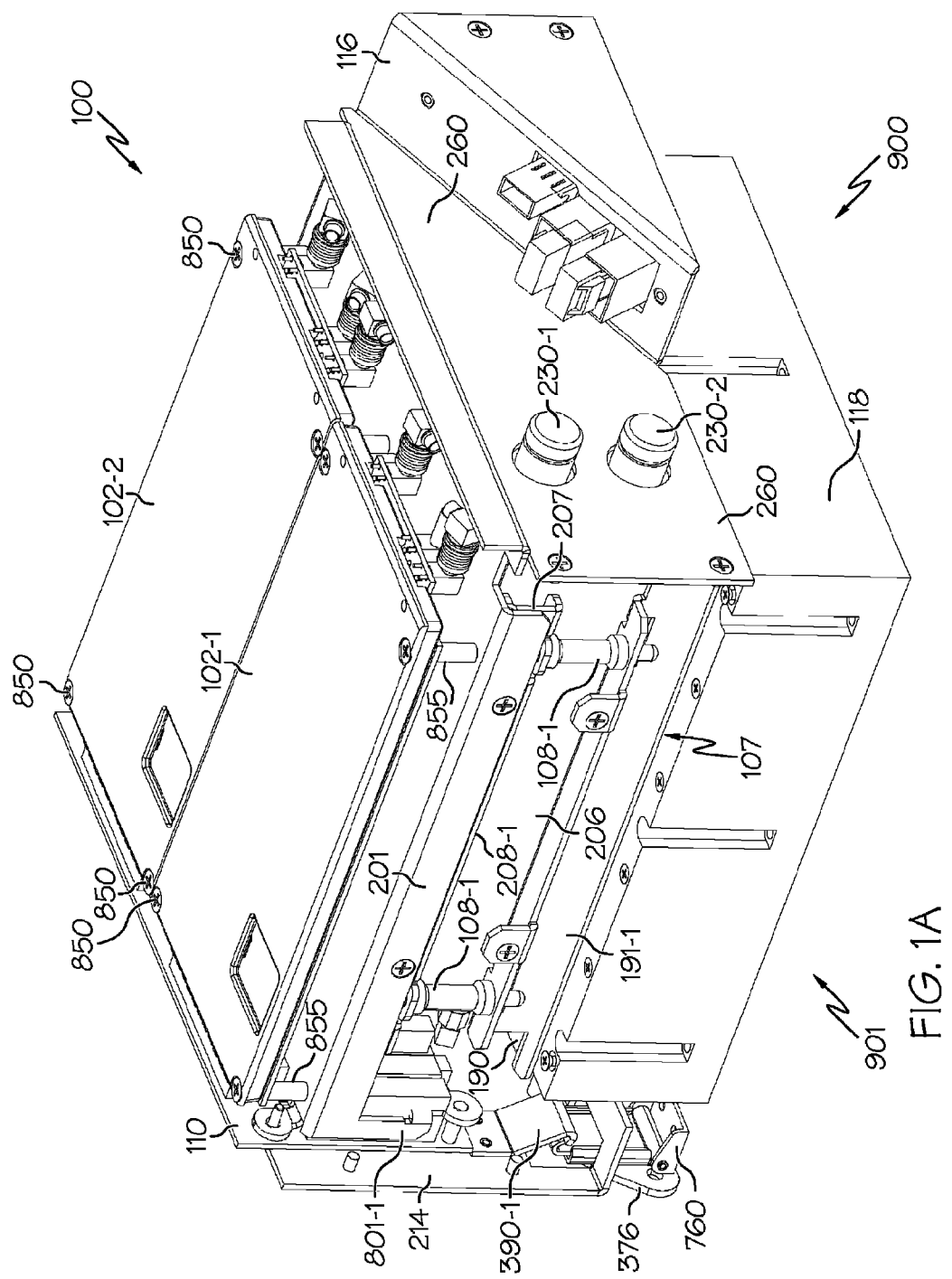
FIGS. 1A-1B are perspective views of embodiments of communication modules in accordance with the present invention.
Figure 1B:
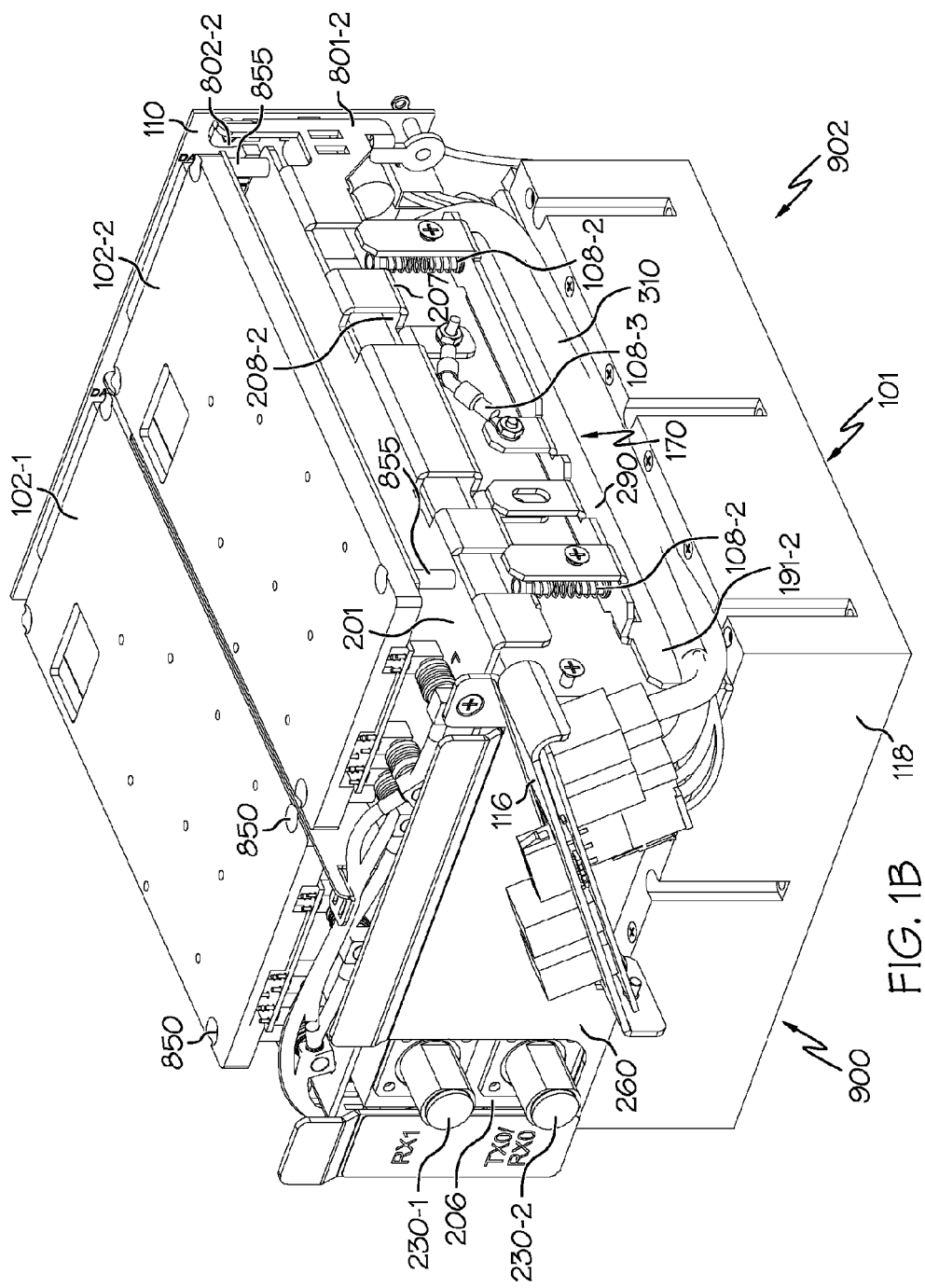

FIGS. 1A-1B are perspective views of embodiments of communication modules 100 and 101, respectively, in accordance with the present invention. A view of a front side 900 and a first side 901 of the communication module 100 are illustrated in FIG. 1A. A view of the front side 900 and a second side 902 of the communication module 101 are illustrated in FIG. 1B. The modules 100 and 101 function in a similar manner and differ slightly in structure. The first side 901, second side 902, and front 900 are arbitrarily set for the purpose of description.

The communication modules 100 and 101 both include at least one transceiver 102(1-2), a filter 206 communicatively coupled with the at least one transceiver 102(1-2), a power amplifier 118. The power amplifier 118 is communicatively coupled to the at least one transceiver 102(1-2), and the filter 206. The communication modules 100 and 101 also include a primary module chassis (of which a front plate 260 is visible in FIGS. 1A-1B) configured to hold the transceivers 102(1-2), the filter 206, and the power amplifier 118. The communication modules 100 and 101 also include a filter suspension frame assembly 170 attached to the primary module chassis. The filter suspension frame assembly 170 is configured to float the transceivers 102(1-2) in relation to the primary module chassis as described in detail below.

The transceivers 102(1-2), the filter 206, the power amplifier 118, an internal interface 110, and an external interface 116 are communicatively coupled to each other via respective data connections. The internal interface 110 (also referred to herein as an internal interface circuit board 110) is a circuit board that provides necessary interface electronics to interconnect the electronic components (e.g., the transceivers 102(1-2), the filter 206, and the power amplifier 118) and the external interface 116. FIG. 1B provides a view of interconnect cables 310 connecting the internal interface circuit board 110 to the external interface 116. The transceivers 102(1-2), the filter 206, and the power amplifier 118 are tuned and calibrated to work with each other.

In one implementation of this embodiment, the transceivers 102(1-2) are radio transceivers 102(1-2) and the filter 206 is an RF filter 206. In such an embodiment, the power amplifier 118, the radio transceivers 102(1-2), and the RF filter 206 are tuned and calibrated to work with each other to provide communications between communicatively coupled devices in a radio frequency communication system. In this latter embodiment, the filter suspension frame assembly 170 is also referred to herein as "RF filter suspension frame assembly 170."

Figure 1C:
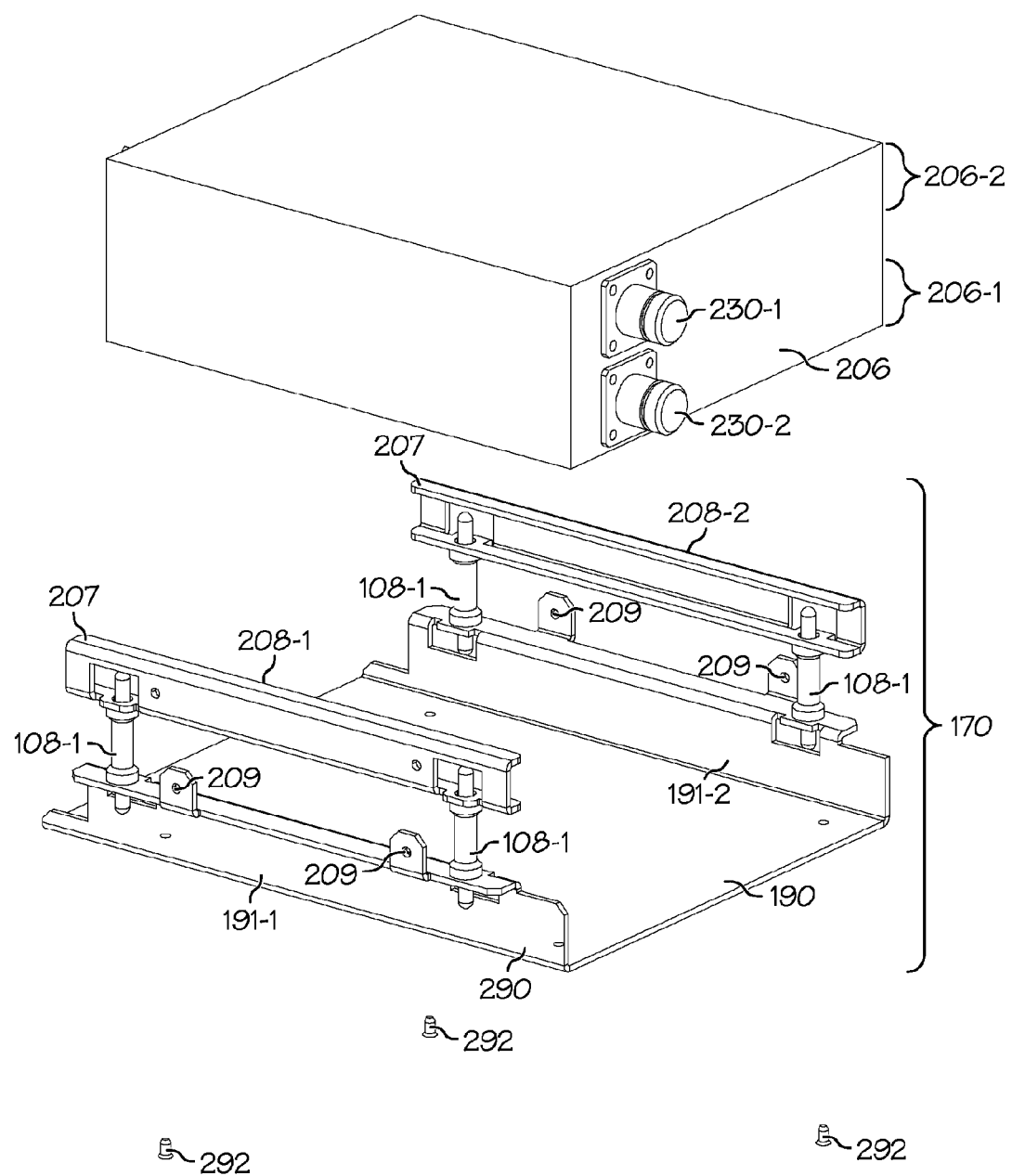
FIG. 1C is an exploded view of an embodiment of a filter suspension frame assembly and a filter in accordance with the present invention.

FIG. 1C is an exploded view of an embodiment of a filter suspension frame assembly 170 and a filter 206 in accordance with the present invention. The filter suspension frame assembly 170 includes a filter-mounting bracket 290, transceiver support rails 207, and compressible standoffs 108-1.

The filter-mounting bracket 290 (also referred to herein as "RF filter-mounting bracket 290") includes a support base 190 and two bottom-frame sections 191(1-2). When assembled, a top portion 206-2 of the filter 206 is positioned between the transceiver support rails 207 and a bottom portion 206-1 of the filter 206 is held in filter-mounting bracket 290. The filter 206 is attached to the support base 190 by attachment devices 292, such as but not limited to screws or bolts.

The compressible standoffs 108-1 attach the filter-mounting bracket 290 to the transceiver support rails 207 to compliantly allow thermally conductive surfaces to contact one another as described below with reference to FIGS. 4 and 5. Specifically, compressible standoffs 108-1 flexibly connect the transceiver support rails 207 to the bottom-frame sections 191(1-2). The compressible standoffs 108-1 (FIG. 1A), 108-2 and 108-3 (FIG. 1B) have the same function although they have different structures and are made from different compressible materials. The compressible standoffs 108(1-3) function to: 1) force the transceivers 102(1-2) to contact a door of a cabinet to provide a thermally conductive path when the door of the cabinet is closed as described in detail below; and 2) to absorb vibrations that impact the modules 100 and 101, respectively, in order to protect the electronic circuits and interconnections of the modules 100 and 101 from vibration shock. When the transceivers 102(1-2) contact a door of a cabinet, the power amplifier likewise contacts a back wall of the cabinet to provide another thermally conductive path.

As shown in FIGS. 1A and 1C, the compressible standoffs 108-1 are made from a compressible, elastomeric material. As shown in FIG. 1B, the compressible standoffs 108-2 are made from a compressible mechanical spring and the compressible standoff 108-3 is made from a compressible a flexible-elbow attachment. The compressible standoffs 108(1-3) are made from material that may include but is not limited to rubber, a helical spring or any type of material or structure that provides the designed amount of deflection and resultant normal force against the cabinet and that aides in the dampening of resonant vibration. In one implementation of this embodiment, compressible standoffs are made from vibration damping material. In another implementation of this embodiment, compressible standoffs are made from thermally insulating material. In yet another implementation of this embodiment, compressible standoffs are made of rubber, a spring, an elastomeric material, vibration damping material, and a flexible-elbow attachment.

Figure 2:
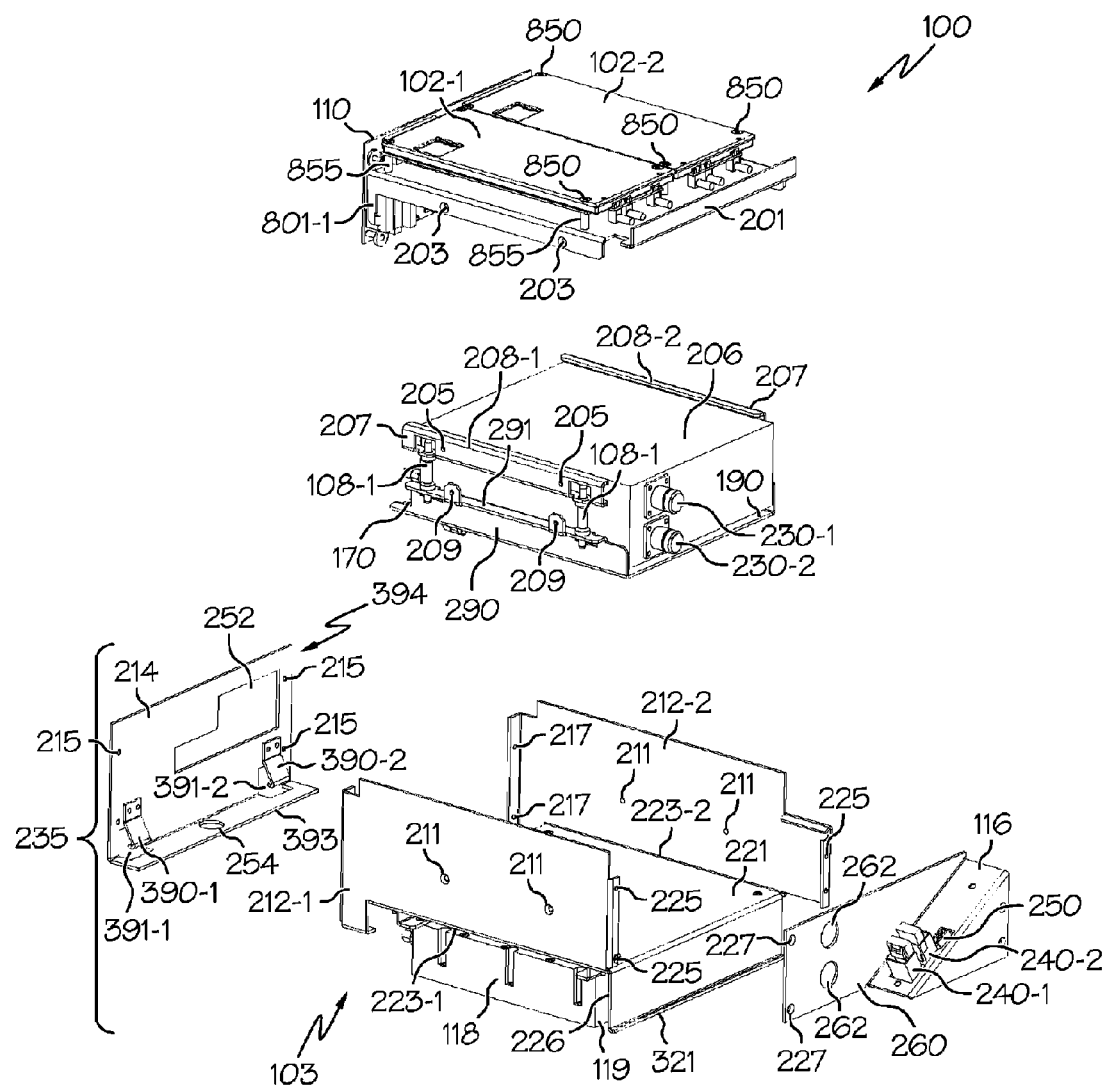
FIG. 2 is an exploded view of an embodiment of a module system and electronic components that are supported by the module system in accordance with the present invention.

FIG. 2 is an exploded view of an embodiment of a module system 103 and the electronic components that are supported by the module system 103 in accordance with the present invention. The module system 103 includes a primary module chassis 235, a transceiver-mounting frame 201, and a filter suspension frame assembly 170. When the module system 103 is assembled, the filter-mounting bracket 290 is attached to the primary module chassis 235. The filter suspension frame assembly 170 flexibly connects the transceiver-mounting frame 201 to the primary module chassis 235. The communication module 100 shown in FIG. 1A is formed when the module system 103 is assembled and integrated with the transceivers 102(1-2), the filter 206, and the power amplifier 118.

The filter suspension frame assembly 170 is as described above with reference to FIG. 1C. The transceiver-mounting frame 201 is flexibly attached to the filter-mounting bracket 290 via the transceiver support rails 207 and the compressible standoffs 108-1. The filter suspension frame assembly 170 is configured to float the at least one transceiver 102(1-2) and the interface electronics on the internal interface 110 (FIG. 1A-1B) in relation to the primary module chassis 235. Pressure applied to the top of the radio transceivers 102(1-2) provided by the doors of the ultimate enclosure causes the compressible standoffs 108(1-3) to compress.

The primary module chassis 235 includes integrated pair of sidewalls 212(1-2), a bottom plate 221, a lower plate 226, a front plate 260, and a back plate 214. The sidewalls 212(1-2) extend from opposing edges 223(1-2), respectively, of the bottom plate 221. The lower plate 226 extends from the bottom plate 221 in a direction that is opposite to the direction in which the sidewalls 212(1-2) extend from the bottom plate 221.

The front plate 260 of primary module chassis 235 is attached to the sidewalls 212(1-2) with attaching devices via apertures 225 in the sidewalls 212(1-2) and apertures 227 in the front plate 260. The front plate 260 includes at least one aperture 262 that allow RF connectors 230-1 and 230-2 (FIGS. 1A-1B) of the RF filter 206 to pass there through, thereby allowing easy connections to the RF filter 206. The external interface 116 is attached to the front plate 260. The external interface 116 includes external data connections 240-1 and 240-2 and a power connection 250.

The filter suspension frame assembly 170 is attached to the sidewalls 212(1-2) with attaching devices via apertures 209 in the filter suspension frame assembly 170 and apertures 211 in the sidewalls 212(1-2). It will be understood that other apertures 203 and 205 not shown in FIG. 2 are also used to attach the RF filter-mounting bracket 290 and filter suspension frame assembly 170.

The back plate 214 is attached to the sidewalls 212(1-2) with attaching devices via apertures 215 in the back plate 214 and apertures 217 in the sidewalls 212(1-2). The back plate 214 also includes cutout sections 252, 254, and 391(1-2). The back plate 214 includes at least one clip 390(1-2) to fasten to respective latches in a cabinet in which the communication module 100 is installed.

The lower plate 226 includes a coupling edge 321. The coupling edge 321 and the clips 390(1-2) are used to attach the primary module chassis 235 to a cabinet as described in detail below. For example, latches on a back surface of the cabinet pass through apertures 391(1-2) in the back plate 214 to connect with the clips 390(1-2). Other structures to attach the back plate 214 to the cabinet are possible.

The power amplifier 118 is attached to the bottom plate 221 of the primary module chassis 235. The lower plate 226 is in contact with (or adjacent to) the side 119 of the power amplifier 118 when the communication module 100 (FIG. 1A) is assembled. In this manner, the power amplifier 118 is partially enclosed by a lower portion 393 of the back plate 214, the lower plate 226, and the bottom plate 221 of the primary module chassis 235. Likewise, the front plate 260, an upper portion 394 of the back plate 214, the bottom plate 221, and the pair of sidewalls 212(1-2) partially enclose the filter 206 when the filter 206 is positioned in the filter suspension frame assembly 170. Thus, the RF filter 206 is surrounded by the primary module chassis 235 and by the transceiver-mounting frame 201 so that the RF filter 206 is generally enclosed except for various openings including the cutout sections 252, 254, 262, and 391(1-2) that allow for connection cables, fasteners, and components to extend out of the primary module chassis 235.

The transceiver-mounting frame 201 is attached to the transceiver support rails 207 of the filter suspension frame assembly 170 on which the radio transceivers 102(1-2) and the internal interface circuit board 110 are mounted. Specifically, the filter suspension frame assembly 170 is attached to transceiver-mounting frame 201 with an attaching device via apertures 203 in the transceiver-mounting frame 201 and apertures 205 in the transceiver support rails 207 of the filter suspension frame assembly 170.

The transceiver-mounting frame 201 holds transceivers 102(1-2). Specifically, the radio transceivers 102(1-2) are rigidly attached to a transceiver-mounting frame 201 by an attaching device 850 (such as, but not limited to, a screw or bolt) via offset-supports 855. The internal interface circuit board 110 is connected to the transceiver-mounting frame 201 by an attaching device 802-2 (FIG. 1B) (such as, but not limited to, a screw or bolt) via apertures in the brace section 801-1 (FIGS. 1A and 2) and brace section 801-2 (FIG. 1B) of the transceiver-mounting frame 201.

The RF filter 206 is received in the RF filter-mounting bracket 290. Specifically, the RF filter 206 is inserted between the support base 190 of the filter suspension frame assembly 170 and the transceiver-mounting frame 201. In this manner, the RF filter 206 on the RF filter-mounting bracket 290 is suspended below the transceiver-mounting frame 201 on which the radio transceivers 102(1-2) are mounted. In one implementation of this embodiment, the RF filter 206 is received in the RF filter-mounting bracket 290 before the transceiver-mounting frame 201 is attached to the upper-frame section 282 of the filter suspension frame assembly 170.

Thus, the primary module chassis 235 provides support for the transceivers 102(1-2), the filter 206, and the power amplifier 118. In one implementation of this embodiment, a space is maintained between the filter 206 being held in the filter-mounting bracket 290 and the power amplifier 118 attached to the primary module chassis 235. In another implementation of this embodiment, a space is maintained between the transceiver-mounting frame 201 and the filter 206 held in the filter-mounting bracket 290.

In one implementation of this embodiment, the transceiver-mounting frame 201 including the brace section 801-1 is formed from a single a single sheet of metal that is cut, crimped, punched, and/or bent as required to attach to the internal interface circuit board, the transceivers 102(1-2), and the transceiver support rails 207. In another implementation of this embodiment, the RF filter-mounting bracket 290 is formed from a single a single sheet of metal that is cut, crimped, punched, and/or bent as required to hold the bottom portion 206-1 of the filter 206. In yet another implementation of this embodiment, the sidewalls 212(1-2), the bottom plate 221, and the lower plate 226 are formed from a single sheet of metal that is cut, crimped, punched, and/or bent as required to accommodate the RF filter 206, the filter suspension frame assembly 170, and the transceiver-mounting frame 201.

The external interface 116, internal interface circuit board 110, and interconnect cables 310 (FIG. 1B) are defined herein as coupling components. The coupling components, which can include electronic circuits, communicatively couple the electronic components as required for operation of the communication module 100. The primary module chassis 235, filter suspension frame assembly 170, and transceiver-mounting frame 201 are defined herein as structural components. The at least one transceiver, the filter, and the power amplifier being tuned and calibrated to work with each other are defined herein as electronic components. Likewise, the at least one radio transceiver, the RF filter, and the power amplifier being tuned and calibrated to work with each other are defined herein as RF electronic components.

Within the communication modules 100 and 101, the high power components generate more heat than the low power components and therefore require a thermally conductive path to a larger, more effective heat sink. The radio transceivers 102(1-2) and the RF filter 206 (low power components) generate less heat than the power amplifier 118 (high power component). The structural components serve a plurality of functions. The structural components provide contact with heat sinks in a cabinet (see FIGS. 4 and 5) that encloses the communication module 100 (or communication module 101). The structural components also provide thermal isolation between electronic components in the communication module 100.

In one implementation of this embodiment, thermal isolation is provided by a space that is maintained between the RF filter 206 attached to the filter-mounting bracket 290 and the power amplifier 118 attached to the bottom plate 221 of the primary module chassis 235 when the communication module 100 is assembled. In another implementation of this embodiment, thermal isolation is provided by a space that is maintained between the RF filter 206 and the transceiver-mounting frame 201 holding the transceivers 102(1-2). In yet another implementation of this embodiment, thermal isolation is provided between the RF filter-mounting bracket 290 and the transceiver support rails 207 by thermally insulating compressible standoffs 108-1 when the communication module 100 is assembled. In yet another implementation of this embodiment, the compressible standoffs 108-1 provide the only thermally conductive path between the high power components and low power components.

Figure 3:
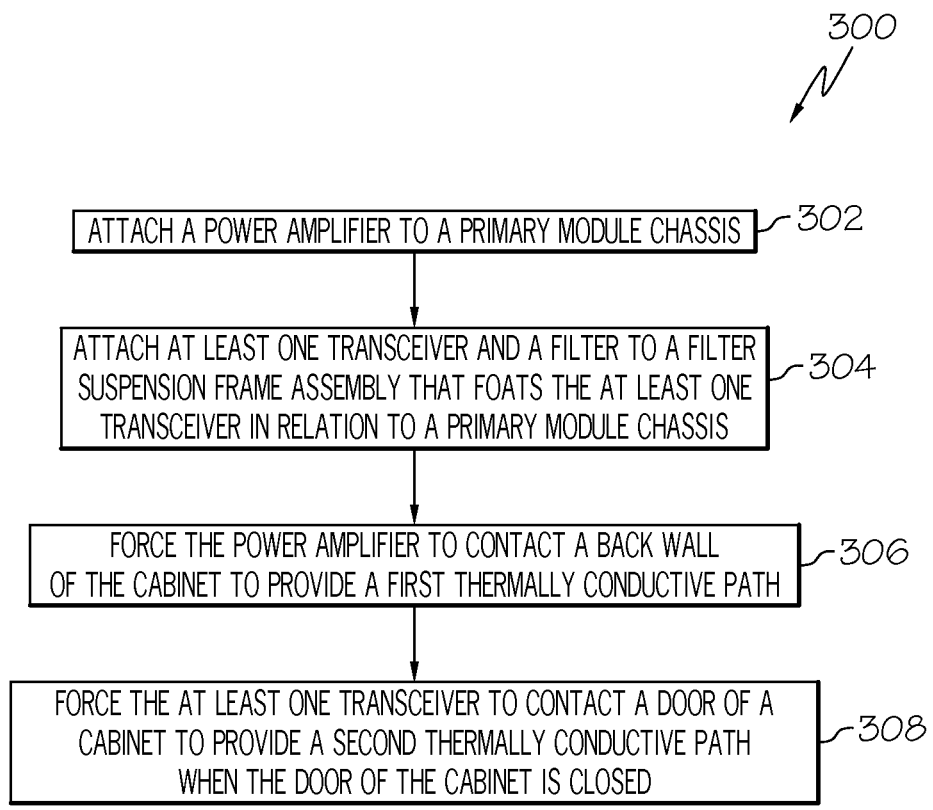
FIG. 3 is a flow diagram of one embodiment of a method to provide heat transfer in a communication module in accordance with the present invention.

FIG. 3 is a flow diagram of one embodiment of a method 300 to provide heat transfer in a communication module in accordance with the present invention. FIG. 4 is a side view of an embodiment of a communication system 400 illustrating the doors 404-1 and 404-2 of a cabinet 401 housing a communication module 100 in an open position. FIG. 5 is a side view of the communication system 400 of FIG. 4 illustrating the doors of the cabinet 401 in a closed position. The communication system 400 includes the communication module 100 (FIG. 1A) in a cabinet 401. The top surface of the cabinet 401 is not visible so as not to obstruct the view of the communication module 100. The back surface of the cabinet 401 is part of or is attached to a first heat sink 402. The doors 404-1 and 404-2 form a second heat sink 405 when in the closed position (FIG. 5). In the embodiment shown in FIGS. 4 and 5, the door hinges 380 (such as cam shaped hinges described in the '581 application) are coupled to edges of the first heat sink 402 to rotatably attach the doors 404-1 and 404-2 (second heat sink 405) to the first heat sink 402. The method 300 is described with reference to an RF communication module 100 shown in FIGS. 1A, 2, 4, and 5. It is to be understood that method 300 can be implemented using other embodiments of the communication module as is understandable by one skilled in the art upon reading and understanding this document.

At block 302, a power amplifier 118 is attached to a bottom plate 221 of a primary module chassis 235 as described above with reference to FIG. 2. At block 304, the radio transceivers 102(1-2) and the RF filter 206 are attached to the filter suspension frame assembly 170 as described above with reference to FIG. 2. The filter suspension frame assembly 170 floats the radio transceivers 102(1-2) in relation to the RF filter-mounting bracket 290 to dampen vibrations.

At block 306, the power amplifier 118 is forced to contact a back wall 377 of the cabinet 401 to provide a first thermally conductive path. The first thermally conductive path is from the power amplifier 118 to the first heat sink 402 via the interface formed between the thermally conductive surface 375 of the power amplifier 118 and the back wall 377 of the cabinet 401. In one implementation of this embodiment, the cabinet 307 has a back wall 377 that is separate from, but in thermal contact with, the heat sink.

Figure 4:
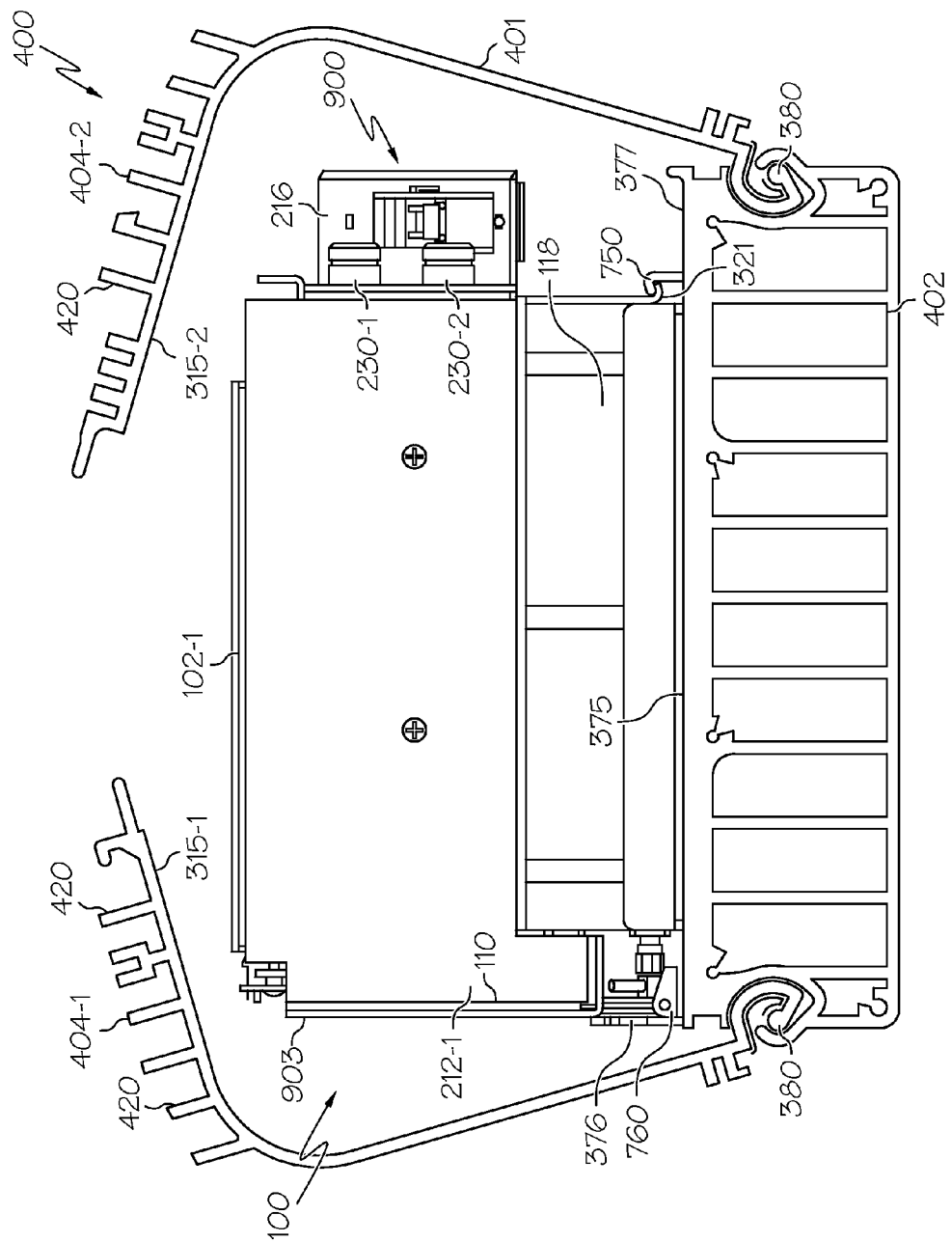
FIG. 4 is a side view of an embodiment of a communication system illustrating the doors of a cabinet housing a communication module in an open position in accordance with the present invention.

As shown in FIG. 4, the communication module 100 is inserted into a cabinet 401. Attachment features, including a module pivot 750 and a latch 760, extend from the back wall 377 and the side section 376 of the cabinet 401. The module system 103 is received in and attached to the cabinet 401 as follows. The coupling edge 321 of the lower plate 226 is configured to link under the module pivot 750 as the module system 103 is rotated into the cabinet 401 with the coupling edge 321 under the module pivot 750. When the power amplifier 118 is contacting the back wall 377 to thermally contact the first heat sink 402, the latch 760 is attached to at least one clip 390-1 (FIGS. 1A and 2) on the primary module chassis 235. In this manner, the power amplifier 118 is securely attached to the cabinet 401 so that the thermally conductive surface 375 of the power amplifier 118 contacts the first heat sink 402. Thus, the high heat generating power amplifier 118 is insulated from the lower heat generating components while thermally contacting a large heat sink 402 to efficiently remove heat from the power amplifier 118. The space between the bottom plate 221 of the primary module chassis 235 (FIG. 2) and the support base 190 (FIG. 1C) of the RF filter suspension frame assembly 170 reduces the conduction of the heat from the power amplifier 118 to the RF filter 206.

Figure 5:
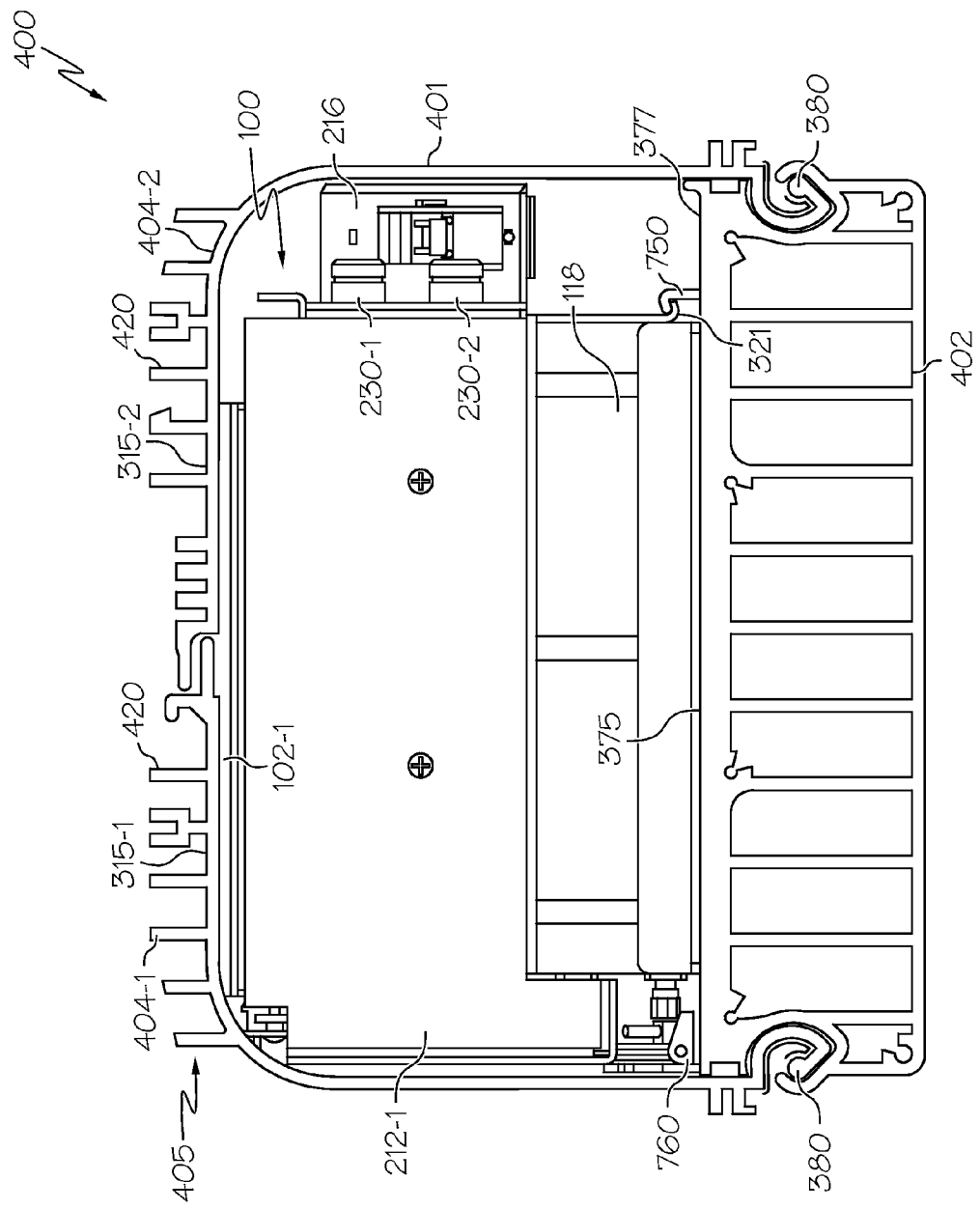
FIG. 5 is a side view of the communication system of FIG. 4 illustrating the doors of the cabinet in a closed position.

At block 308, the radio transceivers 102(1-2) are forced to contact a door 404-1 of a cabinet 401 to create a second thermally conductive path to the second heat sink 405 when the door (or doors) of the cabinet 401 is (are) closed as shown in FIG. 5. The second thermally conductive path is only formed when the doors 404-1 and 404-2 of the cabinet 401 are closed. The second thermally conductive path is from the radio transceivers 102(1-2) to the doors 404-1 and 404-2 (second heat sink 405) via the interface between the top surface of the radio transceivers 102(1-2) and the inside surfaces 315-1 and 315-2 (FIG. 4) of the doors 404-1 and 404-2. The radio transceivers 102(1-2) are low power components and the thermal interface to the doors 404-1 and 404-2 is sufficient to provide the required cooling to the transceivers 102(1-2). As shown in FIGS. 4 and 5, the second heat sink 405 has fins 420 to dissipate the heat.

The compressible standoffs 108-1 (FIG. 2) force the radio transceivers 102(1-2) to contact inside surfaces 315-1 and 315-2 of the doors 404-1 and 404-2, respectively. The compressed compressible standoffs 108-1 provide a normal force between the radio transceivers 102(1-2) and the closed doors 404-1 and 404-2 so that there is continuous physical contact between the radio transceivers 102(1-2) and the closed doors 404-1 and 404-2. This continuous physical contact ensures the continuous provision of a thermally conductive path between the radio transceivers 102(1-2) and the closed doors 404-1 and 404-2.

In one implementation of this embodiment, the compressed compressible standoffs 108-1 provide an increased normal force at the interface of the thermally conductive surface 375 of the power amplifier 118 and back wall 377 of the cabinet 401. This increased normal force improves the thermal conductivity of the first thermally conductive path. This increased normal force is due to the pressure exerted by the compressed compressible standoffs 108-1 pushing on the power amplifier 118 toward the back wall 377 of the cabinet 401 via the filter mounting bracket 290 connected to the pair of sidewall 212(1-2) of the primary module chassis 235.

In one implementation of this embodiment, the RF filter 206 sitting on the lower-frame section 281 (FIG. 2) is pushed into physical contact with the radio transceivers 102(1-2) when the doors 404-1 and 404-2 are closed and the compressible standoffs 108-1 are compressed. In such an embodiment, the heat generated by the RF filter 206 is passed via the transceiver-mounting frame 201 to the back plate 214.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of providing heat transfer in a communication module, the method comprising:
attaching at least one transceiver and a filter to a filter suspension frame assembly that floats the at least one transceiver, via transceiver support rails and at least one compressible standoff, in relation to a primary module chassis, the at least one compressible standoff designed to deflect from a first position to a second position;

forcing a power amplifier to contact a back wall of a cabinet to provide a first thermally conductive path; and forcing the at least one transceiver to contact at least one door of the cabinet to provide a second thermally conductive path when the at least one door of the cabinet is closed.

2. The method of claim 1, wherein forcing a power amplifier to contact a back wall of the cabinet comprises attaching the power amplifier to a primary module chassis.

3. The method of claim 1, wherein the filter suspension frame assembly includes a filter-mounting bracket, the transceiver support rails, and the at least one compressible standoff, the method further comprising:

attaching the filter suspension frame assembly to the primary module chassis; and flexibly connecting a transceiver-mounting frame to the primary module chassis by attaching the transceiver-mounting frame to the transceiver support rails of the filter suspension frame assembly.

4. The method of claim 3, wherein attaching the filter suspension frame assembly to the primary module chassis comprises:

attaching the filter suspension frame assembly to sidewalls of the primary module chassis.

5. The method of claim 4, further comprising:

attaching the at least one transceiver to the transceiver-mounting frame, wherein the at least one compressible standoff in the filter suspension frame assembly forces the at least one transceiver to contact the at least one door of the cabinet when the at least one door of the cabinet is closed.

6. The method of claim 3, further comprising:

attaching the at least one transceiver to the transceiver-mounting frame, wherein the at least one compressible standoff in the filter suspension frame assembly forces the at least one transceiver to contact the at least one door of the cabinet when the at least one door of the cabinet is closed.

7. The method of claim 3, wherein attaching the filter to the filter suspension frame assembly comprises mounting the filter to a filter-mounting bracket in the filter suspension frame assembly, the method further comprising:

attaching the power amplifier to a bottom plate of the primary module chassis, wherein thermal isolation is provided by a space maintained between the filter and the power amplifier.

8. The method of claim 1, wherein attaching the filter to the filter suspension frame assembly comprises mounting the filter to a filter-mounting bracket, the method further comprising:

attaching the power amplifier to a bottom plate of the primary module chassis, wherein thermal isolation is provided by a space maintained between the filter and the power amplifier.

9. The method of claim 1, further comprising:

attaching the power amplifier to a bottom plate of the primary module chassis.

10. A method of providing heat transfer in a module, the method comprising:

attaching a suspension frame assembly to a chassis;

flexibly connecting a mounting frame to the chassis via transceiver support rails and at least one compressible standoff of the suspension frame assembly;

positioning an electronic module to contact a back wall of a cabinet;

attaching the chassis to the cabinet, wherein the electronic module is forced to contact the back wall of the cabinet to provide a first thermally conductive path; and attaching at least one other electronic module to the mounting frame, wherein the at least one compressible standoff in the suspension frame assembly forces the at least one other electronic module to contact at least one door of the cabinet when the at least one door of the cabinet is closed to provide a second thermally conductive path.

11. A method of providing heat transfer in a communication module, the method comprising:

attaching a filter suspension frame assembly to sidewalls of a primary module chassis;

attaching a transceiver-mounting frame to transceiver support rails of the filter suspension frame assembly;

positioning a power amplifier to contact a back wall of a cabinet;

attaching the primary module chassis to the cabinet, wherein the power amplifier is forced to contact the back wall of the cabinet to provide a first thermally conductive path; and attaching at least one transceiver to the transceiver-mounting frame, wherein at least one compressible standoff in the filter suspension frame assembly forces the at least one transceiver to contact at least one door of the cabinet when the at least one door of the cabinet is closed to provide a second thermally conductive path.

\* \* \* \* \*